(12) United States Patent
Morgan et al.

(10) Patent No.: US 7,824,645 B2
(45) Date of Patent: Nov. 2, 2010

(54) HIGH DENSITY CARBON FROM COAL

(75) Inventors: Dwayne R. Morgan, Wheeling, WV (US); Rick D. Lucas, St. Clairsville, OH (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 769 days.

(21) Appl. No.: 11/039,775

(22) Filed: Jan. 20, 2005

(65) Prior Publication Data

US 2006/0083673 A1   Apr. 20, 2006

Related U.S. Application Data

(60) Provisional application No. 60/537,028, filed on Jan. 20, 2004.

(51) Int. Cl.
| | |
|---|---|
| C01B 31/00 | (2006.01) |
| C01B 31/02 | (2006.01) |
| C01B 31/04 | (2006.01) |
| C09C 1/56 | (2006.01) |
| C10L 5/00 | (2006.01) |

(52) U.S. Cl. ............... 423/445 R; 423/448; 423/460; 44/620; 264/29.7

(58) Field of Classification Search ............ 423/445 R, 423/448, 460; 44/607, 591, 620; 156/78; 264/29.6, 29.7; 428/489; 201/6
See application file for complete search history.

(56) References Cited

U.S. PATENT DOCUMENTS

| | | | | |
|---|---|---|---|---|
| 5,888,469 A | * | 3/1999 | Stiller et al. | ............ 423/445 R |
| 6,241,957 B1 | * | 6/2001 | Stiller et al. | ................. 423/448 |
| 6,506,354 B1 | * | 1/2003 | Stiller et al. | ............ 423/445 R |
| 6,656,239 B1 | * | 12/2003 | Rogers et al. | ................. 44/620 |
| 6,749,652 B1 | * | 6/2004 | Rogers | ........................ 44/607 |
| 6,814,765 B1 | * | 11/2004 | Rogers | ........................ 44/620 |
| 2002/0092229 A1 | * | 7/2002 | Rogers et al. | ................. 44/530 |
| 2003/0070364 A1 | * | 4/2003 | Rogers et al. | ................. 51/307 |
| 2006/0222854 A1 | | 10/2006 | Matviya | |

* cited by examiner

*Primary Examiner*—Steven Bos
*Assistant Examiner*—Anthony J Zimmer
(74) *Attorney, Agent, or Firm*—Philip D. Lane

(57) ABSTRACT

A high density carbon material produced from coal is described. The carbon material may have a density ranging from about 1.0 g/cc to about 1.6 g/cc and may have a crush strength of up to about 20,000 psi. The high density carbon material is produced by slowly heating comminuted swelling bituminous coal particles under pressures of 400 psi to about 500 psi to a first temperature at about the initial plastic temperature of the coal. The material is held at this temperature for a period of time sufficient to provide for a uniform temperature throughout the coal. The material is then heated to a second temperature for a period of time sufficient to provide for the coal achieving an essentially uniform temperature. The resulting product is a three-dimensional, self-supporting carbon that has a substantially continuous carbon matrix defining grain boundaries within the carbon matrix. The characteristics of the carbon material may be altered by further heating to carbonize or graphitize the high density carbon material.

8 Claims, No Drawings

HIGH DENSITY CARBON FROM COAL

CROSS-REFERENCE TO RELATED APPLICATION

The present application is based on and claims priority to U.S. Provisional Patent Application No. 60/537,028, filed on Jan. 20, 2004.

This invention was made with Government support under contract number F33615-03-M-5022 awarded by the Air Force. The Government has certain rights in the invention.

FIELD OF THE INVENTION

The invention is directed to the direct production of a high density carbon from coal.

BACKGROUND OF THE INVENTION

Graphites are traditionally produced by first pulverizing a graphitizable coke. This pulverized material is then mixed with a binder, typically pitch, and formed to the desired shape. The shaped coke-pitch mixture is then heated under essentially non-oxidizing conditions to temperatures typically up to about 1200° C. to form a porous carbon. After cooling, the porous carbon is typically impregnated with a pitch and then re-heated to elevated temperatures. This pitch impregnation may be repeated as necessary to further density the shaped carbon. The resulting shaped carbon is then typically heated to temperatures greater than about 2000° C. to effect graphitization.

Non-graphitic, solid, three-dimensional, self-supporting carbons, excluding carbon-carbon composites, generally are not widely commercially available. There are a few examples of commercially available three-dimensional, self-supporting glassy carbons but the cost of these materials is prohibitive for most applications.

Other commercially available three-dimensional, self-supporting carbons would be classified as foams or cokes as their densities are much lower than those of the products of the present invention.

SUMMARY OF THE INVENTION

The invention includes producing a high density carbon material directly from coal. This material as produced is a solid, three-dimensional, self-supporting carbon. The porosity of the carbon material is generally so small and evenly distributed that the carbon material generally visually appears to be a non-porous solid. Typically, pore size may range from about 20 um to about 200 um. This carbon material is produced by heating a comminuted bituminous coal to a first temperature which is generally below the initial plastic temperature for the coal and the coal particles are not substantially swollen. The coal particles are maintained at the first temperature for a period of time sufficient to provide for the coal to achieve an essentially uniform temperature. The coal is then slowly heated to a second temperature, at a rate sufficiently slow as to substantially prevent swelling of the coal. The coal is maintained at the second temperature for a period of time sufficient to provide for the coal achieving an essentially uniform temperature. At this point, the swelling properties of the coal are essentially eliminated. The heating of the coal is carried out under an environmental pressure significantly greater than atmospheric pressure. Typically, such pressures are greater than about 400 psig. During this process the comminuted coal particles form a self-supporting structure that is a substantially continuous carbon matrix. The carbon matrix contains substantially non-crystalline grains that have little or no graphitic character. Following preparation, the solidified product maybe heated to temperatures as high as about 3000° C. to further carbonize, calcine, or graphitize the carbon material. Heating the solidified product to temperatures of about 1800° C. or greater produces a graphitized product in which at least a portion of the grains display graphitic character.

By use of the method of this invention, in certain embodiments carbon material exhibiting a density greater than about 1.0 g/cc may be formed. The high density carbon products of the invention may range from about 1.0 g/cc to about 1.6 g/cc. Other properties of the high density carbon product may include a crush strength greater than about 3000 psi, and may range from about 3,000 psi to potentially about 20,000 psi. For graphitized carbon material, the crush strength may range from about 3000 psi to about 10,000 psi. The room temperature thermal conductivity may range depending on whether the carbon material has been graphitized or not. For non-graphitized carbon, the thermal conductivity is typically about 5 W/mK or lower. For graphitized carbon the thermal conductivity may be about 30 W/mK or higher. The coefficient of thermal expansion may range from about 3 to about 5 ppm/° C. for graphitized material, from about 5 to about 6 ppm/° C. for carbonized material, and greater than about 6 ppm/° C. for low temperature or green carbon. Graphitized carbon materials of the invention may achieve a degree of graphitizability of greater than about 0.4.

An embodiment of the invention may include a carbon material comprising a three-dimensional, self-supporting carbon produced directly from comminuted coal having a continuous carbon matrix having grain boundaries, wherein the carbon material has a density greater than about 1.0 g/cc. The self-supporting carbon may have pores ranging from about 20 μm to about 200 μm. The invention may also include an embodiment where at least a portion of the grain boundaries define grains having graphitic character. Further, the carbon material may have a degree of graphatizability of at least 0.4.

The invention may also include a method for making a carbon material from coal. The method may include steps of heating comminuted swelling bituminous coal under pressure to a first temperature near the initial plastic temperature of the bituminous coal, wherein the pressure ranges from about 400 psig to about 500 psig; holding at the first temperature for a time sufficient to achieve a substantially uniform temperature; and heating to a second temperature sufficiently high to solidify, without substantially swelling, the comminuted coal into a self-supporting structure and form a high density green carbon material. The first temperature may range from about 300° C. to about 350° C. The second temperature may range from about 480° C. to about 550° C. The step of heating comminuted bituminous coal under pressure to a first temperature may be performed at a rate ranging from about 0.5° C./min to about 2° C./min. The step of heating to a second temperature may be performed at a rate ranging from about 0.5° C./min to about 2° C./min.

The invention may also include the step of heating the carbon material to a temperature ranging from about 600° C. to about 1800° C. Still further the invention may include the step of heating the carbon material to a temperature greater than about 1800° C. The method may include the step of heating the carbon material to a temperature greater than about 2200° C. Further, the method may include heating the carbon material to a temperature greater than about 2600° C.

Still further, the method may include heating the carbon material to a temperature ranging from about 1800° C. to about 3200° C.

These properties suggest that such a carbon material may have utility in a variety of applications, including as a structural and thermal transport material for heat exchangers.

DETAILED DESCRIPTION OF EMBODIMENTS OF THE INVENTION

Typically, agglomerating, swelling bituminous coals are heated at rates such that the coal swells and produces a coke or a carbon foam. Cokes and carbon foams have a high degree of porosity and are typically of low density (i.e. less than about 0.8 g/cc). Some applications require the use of denser and/or stronger carbon materials. The process of the invention provides a method by which high-density, strong carbon materials can be prepared directly from coals. The carbon materials are three dimensional, self-supporting structures of a substantially continuous carbon matrix. The carbon matrix defines grain boundaries which outlines area containing carbonaceous grains. The characteristics of the grains may vary depending on the treatment temperature of the carbon material.

The process of the present invention provides for a direct route for the production of high density, self-supporting, three-dimensional carbon materials, particularly graphitic carbon materials, from agglomerating, swelling, bituminous coals. By this process microcrystalline graphites may be prepared directly from coal. Further, non-graphitic high density, self-supporting, three-dimensional carbon materials can be prepared using this method.

The use of high rank bituminous coals, such as low volatile bituminous coals, as a feedstock to the process of the present invention can provide for carbon materials having a high degree of graphitic character. Such graphitic carbon materials will typically including lower production cost than other commercially available graphite materials. This lower cost is expected as the process of the present invention does not require the multiple processing steps common to conventional graphite production schemes.

According to certain embodiments, a high density, self-supporting porous carbon may be produced from agglomerating bituminous coal by use of the following procedure. An agglomerating bituminous coal, preferably having a Free Swell Index greater than about 0.5, is comminuted to a particle size typically less than about 40 mesh and preferably to a particle size less than about 80 mesh (U.S. Standard Series sieves). This sized coal is then placed in a container or mold and heated to a first temperature in an autoclave. This heating is performed in a non-oxidizing atmosphere, such as nitrogen, and under pressure from the non-oxidizing atmosphere that is significantly greater than atmospheric pressure. In certain embodiments, the pressure may range from about 400 psig to about 500 psig at the first temperature. The first temperature is about, or slightly under, the initial plastic temperature of the coal. The initial plastic temperature of the coal is that temperature at which the coal particles begins to soften and becomes sufficiently plastic to adhere to each other. The initial plastic temperature of the coal may vary depending on the coal and process conditions. For most agglomerating bituminous coals, the value of the initial plastic temperature ranges from about 300° C. to about 350° C. Some bituminous coals can exhibit initial plastic temperatures outside this range. In particular, some high rank bituminous coals will exhibit initial plastic temperatures at values above about 350° C. The specific value of the initial plastic temperature for a given coal may be established experimentally for a given coal at the selected process conditions by methods known to those skilled in the art. The first temperature is maintained for a period of time sufficient to provide for a uniform temperature throughout the coal. Generally, a time period of 2 hrs at this first temperature is typically sufficient. The time period may vary depending on the coal and processing conditions. The temperature of the coal is then slowly increased to a second temperature. This second temperature may vary according to the type of coal and desired properties of the coal. For many applications, the second temperature may range from about 480° C. to about 550° C., and typically for many coals about 500° C. The rate of temperature increase to this second temperature is sufficiently slow such that the coal does not swell. In certain embodiment the heating rate for heating to the first temperature and the second temperature may range from about 0.5° C./min to about 2° C./min. The agglomerated coal mass is maintained at the second temperature for a period of time sufficient to provide for the coal achieving an essentially uniform temperature. Following exposure to the second temperature, the now non-swelling agglomerated coal mass may optionally be cooled to essentially ambient temperature. In certain embodiments, heating to the second temperature is performed under a pressure ranging from about 400 psig to about 500 psig and under a non-oxidizing atmosphere.

At this stage, the non-swelling carbon product constitutes a high density green carbon. This green carbon is a carbon material that has a three-dimensional, self-supporting structure. This carbon material has a substantially continuous, carbon matrix that defines grain boundaries within the matrix. The grain boundaries define carbonaceous grains contained within the carbon matrix. Little, if any, of the appearance of this green carbon suggests the particulate nature of the coal starting material from which it was prepared. Typically, the high density carbon of the present invention exhibits a continuous, essentially uniform, structure. That is, visually, this structure does not appear to be comprised of individual coal particles.

It is generally desirous that the coal particles, whether at the first temperature or during that temperature increase to the second temperature, form a high-density carbon material that has a three-dimensional, self-supporting structure. This carbon material has a substantially continuous carbon matrix that define grain boundaries within the matrix. The grain boundaries define carbonaceous grains contained within the carbon matrix.

This high density carbon may also be optionally heated, under non-oxidizing or otherwise inert conditions, to temperatures as great as 3200° C. to further carbonize, calcine, and/or graphitize the carbon. In some embodiments, the high density carbon, especially after exposure to elevated temperatures, has a very similar appearance to that of commercially available graphites and carbons. In all heating or cooling operations, the rate of temperature change of the high density porous carbon should be sufficiently slow as to prevent cracking of the carbon due to induced thermal stresses. It is expected that the graphitic character of the resultant graphitized high density porous carbons will increase as the rank of the bituminous coal increases. As such, graphitized high density porous carbons showing the highest degree of graphitic character are expected to be produced from low volatile bituminous coals.

Optionally, the high density, green carbon material may be heat treated to temperatures ranging from about 600° C. to about 1800° C. Heat treatment may be performed with or without pressure. In certain embodiments, heat treatment is performed under a non-oxidizing atmosphere and ambient pressure. Heat treating the carbon material at temperatures in the range of about 600° C. to about 1800° C. typically results in densification of the carbon product.

As the heat treatment temperature increases from about 1800° C. to about 3200° C., the grains in the carbon matrix exhibit increased graphitic properties. Heat treating may include heating to temperatures above about 1800° C. In other embodiments, heat treatment may include heating to temperatures above about 2200° C. In still other embodiments, heat treatment may include heating to temperatures above about 2600° C. The graphitized carbon materials may exhibit a degree of graphitization of greater than about 0.4, and in some embodiments exhibit a degree of graphitization of about 0.45. The degree of graphitization can be calculated by a technique developed by R. E. Franklin and described in the publication, Franklin, R. E., (1951). Structure of Graphitic Carbons. ACTA Cryst., Vol-4, 253., herein specifically incorporated by reference.

Using the above described methods, high density carbon products having a density greater than about 1 g/cm$^3$ may be formed. The high density carbon products of the invention may range from about 1.0 g/cm$^3$ to about 1.6 g/cm$^3$. Other properties of the high density carbon product may include a crush strength greater than about 3000 psi, and may range from about 3000 psi to potentially about 20,000 psi for non-graphitized material. For graphitized carbon material, the crush strength may range from about 3000 psi to potentially about 10,000 psi. The room temperature thermal conductivity may range depending on whether the carbon material has been graphitized or not. For non-graphatized carbon, the thermal conductivity is typically about 5 W/mK or lower. For graphitized carbon the thermal conductivity may be 30 W/mK or higher. The coefficient of thermal expansion may range from about 3 to about 5 ppm/° C. for graphitized material, 5 to about 6 ppm/° C. for carbonized material, and greater than about 6 ppm/° C. for non-graphitized carbon.

With respect to economic considerations, the process of this invention does not require the use of binders as does known processes in the general technology area. Also, coal, which is known to be relatively inexpensive, is used as the sole feedstock to this process. Optionally, the carbon material may be impregnated with pitch, or other similar materials, and subsequently heat treated to further increase the density of the carbon material. Such pitch impregnations are not necessary to achieve the densities of about 1.0 g/cc to about 1.6 g/cc for the carbon material.

For the carbons derived from higher rank coals, potential products include many of those addressing application areas traditionally addressed by conventional graphite materials. These include electrodes, dies, high temperature insulation and other known applications.

The utilities of the carbon produced from mid to lower rank, swelling, bituminous coals could include structural materials, thermal insulation, molten metal handling equipment, and other applications where high strength, high densities, and resistance to degradation by extreme temperatures are required.

The high density, self-supporting carbon materials of the present invention are expected to have potential utility in a variety of applications. Those carbon materials prepared from high rank bituminous coals should have essentially the utilities of conventional porous graphites at a substantially lower cost. One application in which such carbons may show a high degree of utility is as heat exchangers in thermal management systems used in highly demanding applications. Those carbons prepared from lower rank bituminous coals are expected to have good oxidation resistance and high strength. As such, these carbons may have utility as thermal barriers.

The process of this invention provides for the production of high density, self-supporting, three-dimensional carbon materials by a single step process that utilizes coal as a feedstock. There is no other process known to the inventors that provide for such carbons by as uncomplicated a process as that of the present invention. Therefore production of such carbons by use of the present invention is expected to be economically favorable compared to other process.

It is expected that the properties of the product of this invention (i.e. the carbonized agglomerated coal) can be modified by changes to the process temperatures and pressures. It is also expected that the properties of the coal subjected to this invention may also impact the resultant product properties. For example, it is expected that the graphitic character of the carbonized material will increase with coal rank and with the maximum temperature to which the carbonized material is exposed. It is also expected that graphite materials having properties comparable to many commercial graphites could be potentially prepared by this method. It is expected that these graphite materials could be produced at lower cost and have superior properties to many commercially available graphites. Additionally, it is expected that the self-supporting, three dimensional carbons of the present invention can be machined as necessary to form components of desired configurations.

EXAMPLE

In practice, a high density porous carbon was produced in the following manner. A sample of comminuted low volatile bituminous coal was heated from room temperature to 325° C. at a rate of 2.5° C./min. At room temperature, the process gas pressure over the sample was about 500 psig. The coal sample was held 325° C. for a time period of 1 hour after which the sample was heated to 500° C. at a rate of 0.5° C./min. At 500° C., the process gas pressure over the sample was about 540 psig. The sample was maintained at 500° C. for a time period of about 7 hours, after which the sample was cooled overnight to ambient temperatures. The process temperatures are those shown by the furnace controller. The actual sample temperature could have been different, than the controller values. The sample was subsequently graphitized at a temperature of about 2800° C. The resultant graphitized sample exhibited a density of 1.384 g/cc, a crush strength of 5760 psi, a thermal conductivity of about 55 W/mK at room temperature, and a coefficient of thermal expansion of about 3.5 ppm/° C. These properties suggest that such a carbon material may have utility in a variety of applications, including as a structural material for heat exchangers.

Subsequent analysis of this graphitized sample showed that it had a high degree of graphitic character and could be considered to have equivalent or superior properties to many types of commercial graphites. Therefore this process may provide a novel, relatively inexpensive, route for the production of graphite materials.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for making a carbon material from coal, comprising the steps of:

heating comminuted bituminous coal under pressure to a first temperature of about 300° C. to about 350° C., wherein the pressure ranges from about 400 psig to about 500 psig;

holding at the first temperature for a time sufficient to achieve a substantially uniform temperature throughout the coal, wherein the steps of heating comminuted bituminous coal to the first temperature and holding at the first temperature prevent swelling of the bituminous coal; and heating to a second temperature of about 480° C. to about 550° C., and at a rate to prevent swelling of the comminuted coal and form a high density carbon material having a density ranging from about 1.0 g/cc to about 1.6 g/cc.

2. The method of claim 1, wherein the step of heating comminuted bituminous coal under pressure to a first temperature is performed at a rate ranging from about 0.5° C./min to about 2° C./min.

3. The method of claim 1, wherein the step of heating to a second temperature is performed at a rate ranging from about 0.5° C./min to about 2° C./min.

4. The method of claim 1, further comprising the step of heating the carbon material to a temperature ranging from about 600° C. to about 1800° C.

5. The method of claim 1, further comprising the step of heating the carbon material to a temperature greater than about 1800° C.

6. The method of claim 1, further comprising the step of heating the carbon material to a temperature greater than about 2200° C.

7. The method of claim 1, further comprising the step of heating the carbon material to a temperature greater than about 2600° C.

8. The method of claim 1, further comprising the step of heating the carbon material to a temperature ranging from about 1800° C. to about 3200° C.

* * * * *